United States Patent
Ahmadian et al.

(10) Patent No.: US 10,942,265 B2
(45) Date of Patent: Mar. 9, 2021

(54) SYSTEM AND METHOD FOR DETERMINING THE POSITION OF A TRANSPORT VEHICLE, AND TRANSPORT VEHICLE

(71) Applicant: Konecranes Global Corporation, Hyvinkää (FI)

(72) Inventors: Mohammad Ahmadian, Neuss (DE); Karsten Rupprecht, Aachen (DE)

(73) Assignee: Konecranes Global Corporation, Hyvinkää (FI)

( * ) Notice: Subject to any disclaimer, the term of this patent is extended or adjusted under 35 U.S.C. 154(b) by 309 days.

(21) Appl. No.: 16/098,935

(22) PCT Filed: May 4, 2017

(86) PCT No.: PCT/EP2017/060686
§ 371 (c)(1),
(2) Date: Nov. 5, 2018

(87) PCT Pub. No.: WO2017/191271
PCT Pub. Date: Nov. 9, 2017

(65) Prior Publication Data
US 2019/0086532 A1 Mar. 21, 2019

(30) Foreign Application Priority Data

May 6, 2016 (DE) .......................... 102016108446.8

(51) Int. Cl.
*G01S 13/75* (2006.01)
*B60L 53/38* (2019.01)
(Continued)

(52) U.S. Cl.
CPC ............ *G01S 13/758* (2013.01); *B60L 53/12* (2019.02); *B60L 53/126* (2019.02); *B60L 53/36* (2019.02);
(Continued)

(58) Field of Classification Search
CPC ......... Y02T 90/12; Y02T 90/16; Y02T 10/70; Y02T 10/7072; Y02T 10/92; H04W 4/40;
(Continued)

(56) References Cited

U.S. PATENT DOCUMENTS 8,030,888 B2 * 10/2011 Pandya ............... B60L 11/1809
320/109
2010/0123452 A1 * 5/2010 Amano .................. B60L 53/38
323/359
(Continued)

FOREIGN PATENT DOCUMENTS

DE 102010035155 A1 2/2012
EP 0494114 A2 7/1992
(Continued)

OTHER PUBLICATIONS

Preliminary Report on Patentability of the International Searching Authority in English from corresponding Patent Cooperation Treaty (PCT) Application No. PCT/EP2017/060686, completed Jul. 11, 2018.
(Continued)

*Primary Examiner* — Olumide Ajibade Akonai
(74) *Attorney, Agent, or Firm* — Gardner, Linn, Burkhart & Ondersma LLP

(57) ABSTRACT

A system for determining the position of a transport vehicle that can be moved over a floor, in particular a heavy-load transport vehicle, comprising an antenna which can be attached to a lower face of the transport vehicle and a transponder which can be introduced into the floor at a specific location and which can be charged by means of a transmission field that can be generated by the antenna during a transmission interval and can be evaluated during a subsequent evaluation interval. The system is designed such that the evaluation interval is discontinued and a new transmission interval is started if a signal of the transponder
(Continued)

cannot be detected during a detection interval within the evaluation interval.

20 Claims, 3 Drawing Sheets

(51) Int. Cl.
|  |  |
|---|---|
| *B60L 53/126* | (2019.01) |
| *B60L 53/12* | (2019.01) |
| *B60L 53/36* | (2019.01) |
| *B60L 53/39* | (2019.01) |

(52) U.S. Cl.
CPC .............. *B60L 53/38* (2019.02); *B60L 53/39* (2019.02); *B60L 2200/36* (2013.01); *H02J 2310/48* (2020.01); *Y02T 90/12* (2013.01)

(58) Field of Classification Search
CPC ....... H04W 4/44; H04W 4/029; H04W 4/024; H04W 4/023; B60L 53/12; B60L 2200/36; B60L 53/36; B60L 53/38; B60L 58/12; B60L 53/10; B60L 53/39; B60L 53/305; B60L 53/53; B60L 53/66; B60L 11/182; B60L 2240/72; B60L 2240/80; H02J 7/0047; H02J 2310/48; H02J 7/0027; H02J 7/0077; H02J 50/12; H02J 7/00034; H02J 7/025; H02J 50/10; H02J 50/80; H02J 5/005; G01S 15/931; G01S 13/756; G01S 17/10
USPC .................................................. 320/104, 108
See application file for complete search history.

(56) References Cited

U.S. PATENT DOCUMENTS

| 2012/0293119 | A1* | 11/2012 | Park | H02J 50/80 |
|  |  |  |  | 320/108 |
| 2014/0285141 | A1* | 9/2014 | Lee | H02J 50/80 |
|  |  |  |  | 320/108 |
| 2015/0336464 | A1* | 11/2015 | Bell | H02J 50/90 |
|  |  |  |  | 320/108 |
| 2017/0028854 | A1* | 2/2017 | Lee | B60L 53/60 |
| 2018/0323660 | A1* | 11/2018 | Lee | G06K 9/3208 |

FOREIGN PATENT DOCUMENTS

| WO | 9120067 | A1 | 12/1991 |
| WO | 2008034742 | A | 3/2008 |

OTHER PUBLICATIONS

International Search Report of the International Searching Authority from corresponding Patent Cooperation Treaty (PCT) Application No. PCT/EP2017/060686, indicated completed on Aug. 23, 2017.
Written Opinion of the International Searching Authority from corresponding Patent Cooperation Treaty (PCT) Application No. PCT/EP2017/060686, indicated completed on Aug. 23, 2017.
International Preliminary Examination Report from corresponding Patent Cooperation Treaty (PCT) Application No. PCT/EP2017/060686, transmitted Jul. 11, 2018.

* cited by examiner

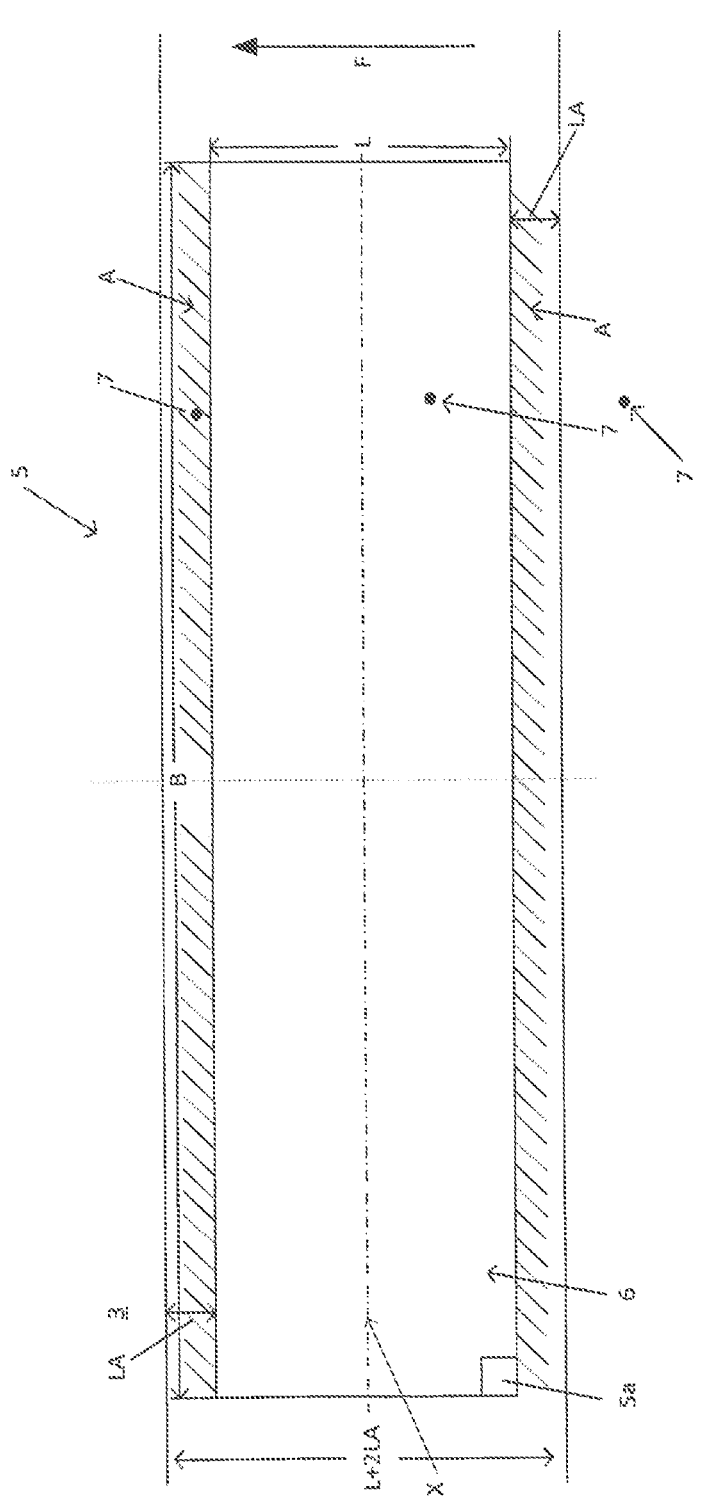

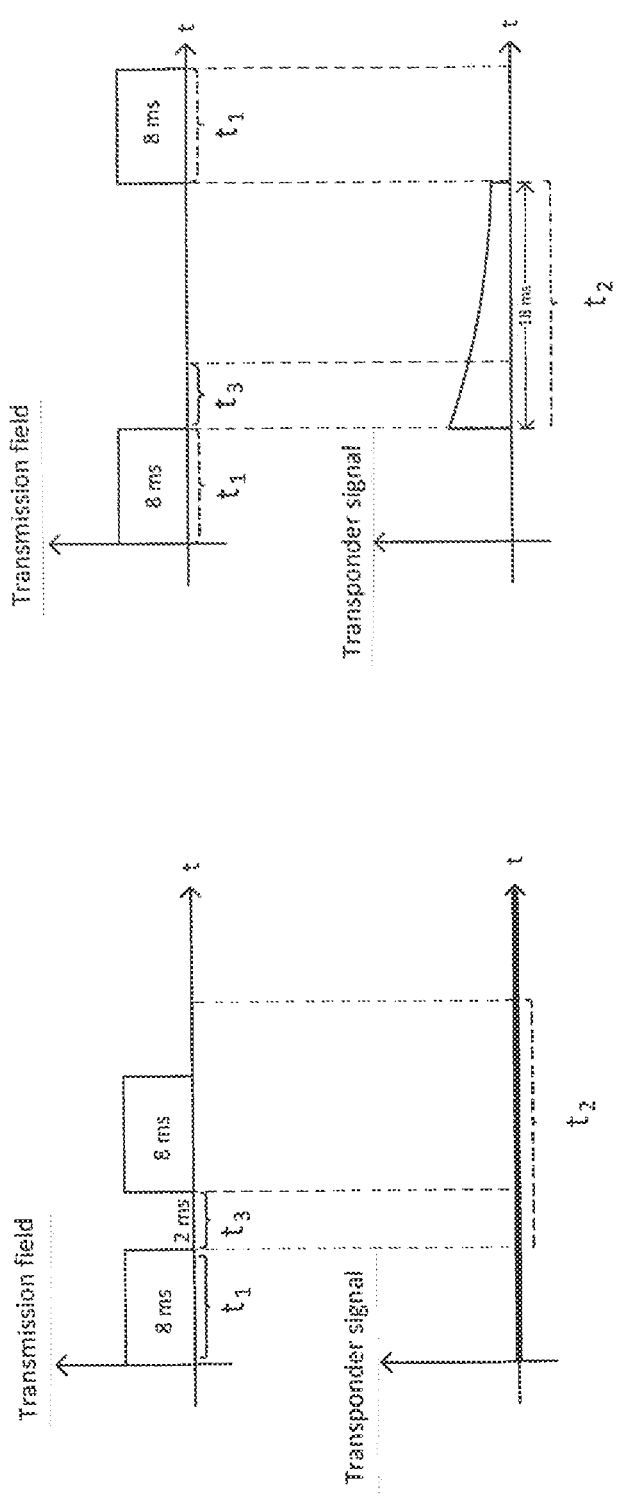

SYSTEM AND METHOD FOR DETERMINING THE POSITION OF A TRANSPORT VEHICLE, AND TRANSPORT VEHICLE

The present application claims the priority benefits of International Patent Application No. PCT/EP2017/060686, filed May 4, 2017, and claims benefit of German patent application DE 10 2016 108 446.86, filed May 6, 2016.

BACKGROUND OF THE INVENTION

The invention relates to a system for determining the position of a transport vehicle which can travel over a floor, in particular of a heavy-load transport vehicle, comprising an antenna, which is attached to a lower face of the transport vehicle, and a transponder, which is introduced into the floor at a specific location and which is charged by means of a transmission field—which can be generated by the antenna during a transmission interval with a preset length—and wherein an evaluation interval with a preset length is subsequently started in order to evaluate a signal of the transponder, transmitted as a response to the charging, during the evaluation interval by means of an evaluation unit.

The invention also relates to a transport vehicle comprising such a system.

Furthermore, the invention relates to a method for determining the position of a transport vehicle which can travel over a floor, in particular of a heavy-load transport vehicle, wherein, by means of an antenna, which is attached to a lower face of the transport vehicle, a transponder, which is introduced into the floor at a specific location, is charged during a transmission interval with a preset length and wherein an evaluation interval with a preset length is subsequently started in order to evaluate a signal of the transponder, transmitted as a response to the charging, during the evaluation interval by means of an evaluation unit.

From the German laid-open document DE 10 2006 044 645 A1 unmanned container transport vehicles are known which comprise an antenna-transponder system. By means of the antenna disposed on the container transport vehicle, it is possible to detect transponders let into a floor and to call up and evaluate the coordinates thereof as encoded information in order to permit navigation of the unmanned container transport vehicles.

In relation to this the use of corresponding antenna-transponder systems is also known, these operating according to the so-called half-duplex method and comprising a passive RFID transponder.

The documents EP 0 494 114 A2 and WO 91/20067 A1 also disclose antenna-transponder systems.

A method for determining position using RFID tags is known from DE 10 2010 035 155 A1.

SUMMARY OF THE INVENTION

The object of the invention is to provide an improved system for determining the position of a transport vehicle, an improved transport vehicle with such a system and an improved method for determining the position of a transport vehicle.

In order to improve a system for determining the position of a transport vehicle which can travel over a floor, in particular of a heavy-load transport vehicle, comprising an antenna, which is attached to a lower face of the transport vehicle, and a transponder, which is introduced into the floor at a specific location and which is charged by means of a transmission field—which can be generated by the antenna during a transmission interval with a preset length—and wherein an evaluation interval with a preset length is subsequently started in order to evaluate a signal of the transponder, transmitted as a response to the charging, during the evaluation interval by means of an evaluation unit, it is proposed that the system be designed in such a way that the evaluation interval is interrupted before expiry of its preset length and a new transmission interval is started if, during a detection interval with a preset length within the evaluation interval, no signal of the transponder is detected. In this way, in an advantageous manner, the waiting time between two measurement cycles or the charging phases of the half-duplex transponders during the transmission intervals can be shortened so that the antenna can be reduced in size as described below, without having to reduce the maximum speed. Furthermore, it is even possible to achieve higher maximum speeds with the same or smaller antenna dimensions. Therefore, in spite of the small installation space, a corresponding system can be used in existing transport vehicles.

Furthermore, in an advantageous manner, provision is made that the new transmission interval is started only after full expiry of the evaluation interval, if a signal of the transponder is detected during the detection interval.

According to a further advantageous embodiment, provision is made that the transmission interval lasts less than 10 ms, preferably 8 ms, the detection interval lasts less than 5 ms, preferably 2 ms, and the evaluation interval lasts less than 20 ms, preferably 18 ms. Measurements have shown that a duration of the transmission interval of 8 ms, but in any case less than 10 ms, may even be sufficient. The advantageous reduction in the antenna dimensions as described below with the aid of an exemplified embodiment can also be achieved for a maximum speed of the transport vehicle of 10 m/s and can be implemented with little space requirement compared with the above-described prior art.

Furthermore, in an advantageous manner, provision is made that the transmission field comprises an effective area extended beyond antenna dimensions of the antenna and extending, in particular, in and opposite to a travel direction of the transport vehicle. This has an advantageous effect since the transport vehicle can travel forwards and backwards in and opposite to the travel direction and consequently the antenna must have correspondingly symmetrical properties. By means of such a field distribution of the transmission field, the antenna dimensions can be reduced further without at the same time having to reduce the maximum speed. Only after charging, i.e. after expiry of an effective transmission interval, must the transponder be located within the antenna dimensions as seen in plan view.

In a constructionally simple manner, a transport vehicle can comprise a corresponding system and be designed as a driverless transport vehicle. By means of the described system, the transport vehicle can be guided and navigated automatically in a particularly safe and reliable manner during driverless operation.

In order to improve a method for determining the position of a transport vehicle which can travel over a floor, in particular of a heavy-load transport vehicle, wherein by means of an antenna, which is attached to a lower face of the transport vehicle, a transponder, which is introduced into the floor at a specific location, is charged during a transmission interval with a preset length and wherein an evaluation interval with a preset length is subsequently started in order to evaluate a signal of the transponder, transmitted as a response to the charging, during the evaluation interval by means of an evaluation unit, it is proposed that the evaluation interval be interrupted before expiry of its preset length and a new transmission interval be started if, during a detection interval with a preset length within the evaluation interval, no signal of the transponder is detected. In this way the advantages already described above with respect to the system are analogously achieved, in particular the possibility of reduced antenna dimensions while achieving a maximum speed which at least remains the same or is even higher.

Furthermore, in an advantageous manner, provision is made that the new transmission interval is started only after full expiry of the evaluation interval, if a signal of the transponder is detected during the detection interval.

In order to achieve a maximum speed of e.g. 10 m/s with comparatively little space requirement for the antenna, provision can be made that the transmission interval lasts less than 10 ms, preferably 8 ms, the detection interval lasts less than 5 ms, preferably 2 ms, and the evaluation interval lasts less than 20 ms, preferably 18 ms.

A still more extensive reduction in the space requirement for the antenna can be achieved in that the transmission field comprises an effective area extended beyond antenna dimensions of the antenna and extending, in particular, in and opposite to a travel direction of the transport vehicle.

The measuring principle applied in the present case is thus the determination of the position of an antenna by means of a corresponding transponder. In this case, for the duration of a specific transmission interval, the antenna transmits an electromagnetic field also designated as a transmission field, by which the transponder is charged with power in order to be able to transmit a response to the antenna. After expiry of this transmission interval, the antenna switches the transmission field off and the charged transponder transmits, for the duration of an evaluation interval, a code as a response, which can contain e.g. its coordinates as information. By means of an evaluation unit of the system the code transmitted by the transponder is read out and decoded during the evaluation interval. The evaluation also includes, in addition to the reading-out and decoding of the code, the comparison, carried out by the evaluation unit for measurement purposes, of voltages induced in coils of the antenna. In this case, a plurality of coils for the travel direction and a plurality of coils transverse thereto are mounted. By means of the induced voltages, the position of the transponder, which is clearly identifiable by its code, in relation to the antenna dimensions and, in addition, the position of the transport vehicle is calculated. After expiry of the evaluation interval, the next measurement cycle begins with a further transmission interval for charging the transponder and a further evaluation interval for evaluating the transponder. During the transmission interval and also during the evaluation interval, the transponder must be disposed vertically below the antenna and therefore within the antenna dimensions as seen in plan view. The antenna dimensions therefore correspond, in their vertical projection onto the floor, to a measurement field of the antenna which corresponds to an effective area of the transmission field and is at the same time effective for the evaluation. Outside the measurement field, the charging or subsequent reading-out and measurement of the transponder are not possible.

If, at the beginning of the transmission interval and with the transport vehicle at maximum speed, the transponder is not yet located vertically below the antenna and therefore, in a type of worst-case scenario, e.g. is still just outside the effective area of the transmission field for a period of 1 ms and therefore outside the measurement field of the antenna, no effective measurement cycle, and therefore no effective charging and evaluation of a response signal of the transponder, are possible. In this case, it is necessary to wait first for the expiry of the first measurement cycle already begun 1 ms ago and then to wait until the end of a further complete measurement cycle in order to render possible effective charging and reading-out and measurement of the transponder. In order to reliably ensure an effective measurement cycle, the measurement field of the antenna must then be dimensioned correspondingly large with respect to a desired maximum speed of the transport vehicle. In the case of a maximum speed of 6 m/s, a transmission interval of 15 ms and an evaluation interval of 18 ms, a required measurement field with a length of 6 m/s×(15 ms+18 ms)×2=396 mm as seen in the travel direction of the transport vehicle is obtained. For a measurement field of this length, the corresponding length dimension of such an antenna generally amounts to more than 1000 mm. Known length dimensions for the transport vehicles described in more detail below are e.g. 1160 mm or 1250 mm. At a maximum speed of 10 m/s a length of 660 mm is obtained for the required measurement field using the same manner of calculation. In order to produce measurement fields of such size, antennas with even greater dimensions would need to be installed. However, since in general only a limited installation space for accommodating corresponding antennas is available on the lower faces of the transport vehicles concerned, it is often possible to install only relatively small antennas which permit only correspondingly low maximum speeds. For higher maximum speeds and larger antennas required for this purpose, new constructions which are expensive for use in vehicles would be necessary.

An exemplified embodiment of the invention is explained in greater detail with reference to the following description.

BRIEF DESCRIPTION OF THE DRAWINGS

FIG. 2 shows a view of an antenna of the system for determining the position of the transport vehicle;

FIG. 3 shows a transmission procedure of the antenna for the case where no transponder can be detected; and FIG. 4 shows transmission procedures of the antenna and of a detected transponder.

DESCRIPTION OF THE PREFERRED EMBODIMENTS

Figure 1:
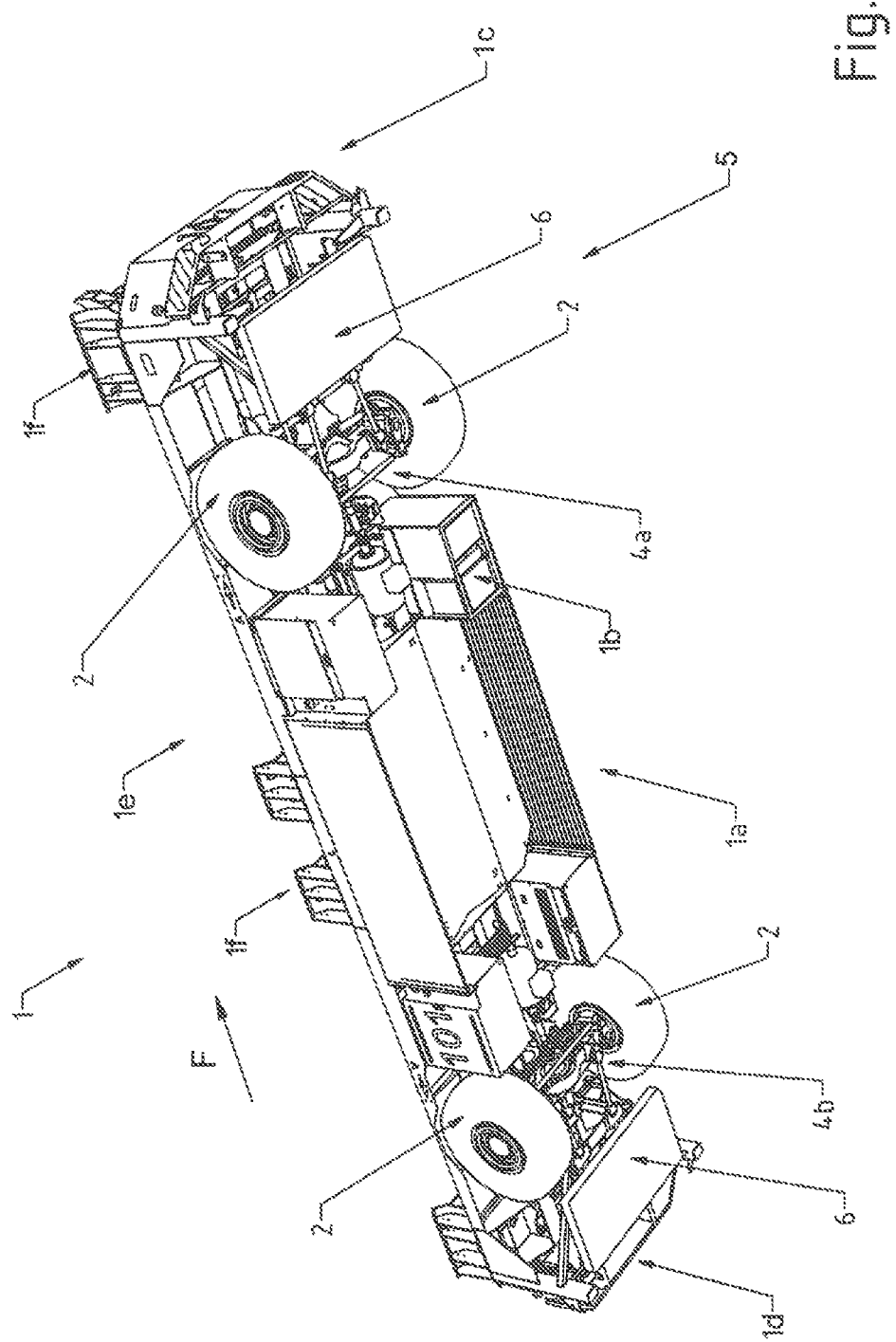
FIG. 1 shows a perspective view of a transport vehicle.

FIG. 1 shows a perspective view of a transport vehicle 1. In particular, a lower face 1a of the transport vehicle 1 is illustrated. The transport vehicle 1 is designed for heavy-load transportation and accordingly comprises, on its upper face 1e, a loading surface, in particular for receiving and transporting swap bodies or ISO containers with a length of 20, 40 or 45 feet. Such containers can weigh up to 45 t in the loaded condition. The loading surface is conventionally defined by a plurality of mutually spaced guide elements 1f which are also designated as position adapters and guide a container to be received by the transport vehicle 1 or the corner fittings thereof onto the loading surface. For this purpose, the guide elements 1f extend with their guide surfaces inclined outwardly and upwards away from the loading surface. The transport vehicle 1 can travel freely on a floor 3 (see FIG. 2) by means of wheels 2 and can therefore travel in a floor-bound but not rail-bound manner. Accordingly, the transport vehicle 1 is to be distinguished from rail vehicles and in particular railway wagons. The wheels 2 are each provided with a tyre arrangement which is preferably an air-filled rubber tyre arrangement in the sense of tyres. Furthermore, the transport vehicle 1 comprises a travel drive with a motor, designed e.g. as an electric motor or internal combustion engine, and a transmission in order thereby to drive the wheels 2 mounted in pairs on a front axle 4a and a rear axle 4b. The transport vehicle 1 can thus travel forwards in the travel direction F and backwards against this travel direction.

Furthermore, the transport vehicle 1 is designed as a driverless transport vehicle 1 and can accordingly be operated unmanned and in an automatically guided manner as a so-called AGV (Automated Guided Vehicle). This does not include vehicles which are driverless but are remotely controlled manually by an operator. Accordingly, the transport vehicle 1 comprises a vehicle controller 1b which, for the purpose of automatic navigation, also comprises a system 5 of the type described in the introduction for determining the position of the transport vehicle 1. The system 5 comprises at least one antenna 6, in the present exemplified embodiment, two antennas 6, and at least one transponder 7 introduced into the floor 3 at a specific location, but preferably a multiplicity of transponders 7 which are introduced into the floor 3 in a grid-like manner at specific locations (see FIG. 2). With respect to the construction and manner of operation of the system 5, the introductory statements apply in a corresponding manner in addition to the differences in accordance with the invention as described below.

As shown in FIG. 1, the two antennas 6 are provided on the lower face 1a, one of them being disposed between a front end 1c of the transport vehicle 1 and the front axle 4a and one between a rear end 1d of the transport vehicle 1 and the rear axle 4b.

FIG. 2 shows a view of one of the two antennas 6 of the system 5 serving as sensors in each case. A plan view is shown of the antenna 6 in its installation position in the transport vehicle 1, not illustrated, in which it extends in a plane parallel to the floor 3. The statements relating to this antenna 6 apply correspondingly to both antennas 6. The antenna 6, or its outer sheet metal body, has, as seen in a plan view, a two-dimensional and substantially rectangular construction with a length L of e.g. 700 mm extending in the travel direction F of the transport vehicle 1 (see also FIG. 1) and a width B extending transversely thereto which can be e.g. 1500 to 2000 mm. On the sides facing the travel direction F and opposite thereto, the sheet metal body of the antenna 6 is bent in such a way that the electromagnetic field transmitted by the antenna 6 to charge the transponders 7 is built up not only vertically downwards but inclined in or opposite to the travel direction F. In this way, an effective area A of the electromagnetic field transmitted by the antenna 6, extended by e.g. 10 cm is produced beyond the antenna dimensions both in and opposite to the travel direction F. The effective area of this transmission field therefore comprises the antenna dimensions additionally to the two extended effective areas A. In this way, a transponder 7 can be charged even if, as seen in the plan view according to FIG. 2, the transponder 7 is still located outside the antenna dimensions of the antenna 6, the antenna 6 is thus still not positioned with its antenna dimensions vertically above the transponder 7. For a charging procedure, the transponder 7 merely has to be located upstream of the antenna dimension, as seen in the travel direction F in the plan view of FIG. 2, and thus within the extended effective area A.

FIG. 2 illustrates in an exemplified manner not only the transponder 7 disposed in the extended effective area A but also a second transponder 7 which is located vertically below the antenna 6, and a third transponder 7 located outside the transmission field. The transponders 7 serving as passive marking elements are preferably designed as RFID transponders, in particular half-duplex transponders.

Different types of coils (not illustrated) are installed in the sheet metal body of the antenna 6. A coil is provided to charge the transponder 7 with power. A further coil is provided to be able to receive a signal of the transponder 7 as a response and therefore to be able to read out and decode the code thereof. Furthermore, within the antenna 6, a plurality of coils for precise two-dimensional measurement of the position of the transponder 7 below the antenna 6 are disposed in the travel direction F and transversely to the travel direction F since the transponder 7 induces voltages in these coils. In this case, within the framework of the evaluation, it is possible for monitoring or checking also to take place in relation to whether the transponder 7 passes the centre line X of the antenna 6 extending parallel to the width B. However, the transponder 7 must be located vertically below the antenna dimensions not only for the evaluation for measurement of its position but also for the detection described hereinunder with the aid of FIGS. 3 and 4. The extended effective areas A are thus not part of the measurement field effective for the evaluation and detection. In other words, with respect to the effective area of the transmission field, the effective area of the measurement field is thus reduced in size by the extended effective area A facing in the direction opposite to the travel direction F. In contrast, the extended effective area A facing in the direction of the travel direction F is, as described above, part of the effective area of the transmission field and therefore also part of the measurement field of the antenna 6 effective for charging purposes.

Detection constitutes an extended functionality both for the system 5 for determining the position of the transport vehicle 1 and also with respect to the method which can be carried out thereby for determining the position of the transport vehicle 1. According to this extended functionality, provision is made that a measurement cycle includes a transmission interval t1 and an evaluation interval t2 subsequent thereto, wherein, however, the evaluation interval t2 can include a variable duration depending on whether, at the beginning of the transmission interval t1, a transponder 7 is located within the transmission field described above and therefore may or may not be detected.

FIG. 3 shows a transmission procedure of the antenna 6 for the case where no transponder 7 or no transponder signal can be detected. In this case, after expiry of the transmission interval t1, the transmission field is shut off and, with the beginning of the evaluation interval t2, for the duration of a detection interval t3, a check is made as to whether a signal of a transponder 7 can be detected. The signal transmitted as a response to the charging phase includes a code which contains the co-ordinates of the transponder 7 as information. However, this signal can be detected only when a transponder 7 has already been located within the above-described effective area of the transmission field at the beginning of a transmission interval t1, so that the transponder 7 was able to be charged effectively in order to be able to transmit its code to the antenna 6 as a response or signal. The transmission interval t1 of the system 5 corresponds to the charging time of the transponders 7, in the present exemplified embodiment preferably about 8 ms and therefore considerably less than in the example named as prior art in the introduction. In this exemplified embodiment, the evaluation interval t2 lasts 18 ms and the detection interval t3 lasts 2 ms. If no signal of a transponder 7 can be detected up to expiry of the detection interval t3 (see bottom diagram in FIG. 3), the evaluation interval t2 is interrupted prematurely and a second measurement cycle with a new transmission interval t1 is started (see top diagram in FIG. 3). The detection interval t3, beginning at the same time as the evaluation interval t2 after expiry of the transmission interval t1, is in this case thus considerably shorter than the evaluation interval t2 required for complete evaluation and therefore expires within the evaluation interval t2. In contrast to the prior art described in the introduction, it is therefore not necessary to wait until the end of the evaluation interval t2 if, in the preceding transmission interval t1, no transponder 7 has been located in a vicinity sufficiently close for effective charging.

FIG. 4 shows transmission procedures of the antenna 6 (see top diagram) and of a detected transponder 7 (see bottom diagram). In this case, a signal of the transponder 7 is thus detected within the detection interval t3 and so the evaluation interval t2 is not interrupted even with the expiry of t3. The next transmission interval t1 of the second measurement cycle therefore begins only after complete expiry of the evaluation interval t2, i.e. in this case after 18 ms.

In this way, where the maximum speed remains constant, the antenna dimensions in the travel direction F can be reduced or, where the antenna dimensions remain constant, higher maximum speeds can be achieved since, in the above-described worst-case scenario, the first measurement cycle can be shortened accordingly by the difference between the duration of the evaluation interval t2 and the duration of the detection interval t3. This also applies if the antenna 6 does not comprise an extended effective area A of the transmission field. In the present exemplified embodiment, for a desired maximum speed of 10 m/s, a transmission interval t1 of 8 ms, an evaluation interval t2 of 18 ms and a detection interval t3 of 2 ms as seen in the travel direction F of the transport vehicle 1 there is therefore a required measurement field with a length of 10 m/s×(8 ms+2 ms+8 ms+18 ms)=360 mm. If the antenna 6 is designed in such a way that its transmission field comprises extended effective areas A, the length L of the antenna 6 can be shortened accordingly. The effective area of the transmission field of the antenna 6 illustrated in FIG. 2 is, as seen in the travel direction F, extended beyond the length L of 700 mm over both effective areas A by a length LA of the extended effective area A of 100 mm in each case to a total of 900 mm. The effective measurement field extends in the travel direction F over the length L of 700 mm and additionally over a length LA of the extended effective area A of 100 mm, i.e. a total of 800 mm. The length L of the antenna 6 of 700 mm is therefore not only shorter compared with the prior art antenna mentioned in the introduction and having a length of 1160 mm or 1250 mm but is also suitable for producing an increase in the maximum speed from 6 m/s to 10 m/s.

The detection and evaluation of the transponder 7 are effected via an evaluation unit 5a, schematically illustrated in FIG. 2, of the system 5, which evaluation unit is connected to the vehicle controller 1b in order to navigate the transport vehicle 1 in an automatically guided manner. Evaluation is then carried out in the evaluation unit 5a and a transmission is effected to the vehicle controller 1b indicating whether the detection and subsequent evaluation, possibly including checking that the centre line X has been passed, deliver a valid value.

It is also feasible for the transport vehicle 1 to be designed as a so-called terminal tractor or terminal truck. In this case, the transport vehicle 1 can be used as a towing vehicle for a trailer comprising the loading surface and position adapters in order thereby to form a type of tractor-trailer rig. The statements above thus also apply analogously to such towing vehicles.

The invention claimed is:

1. A system for determining the position of a transport vehicle which can travel over a floor the system comprising a controller for automatic navigation of the transport vehicle and an antenna attached to a lower face of the transport vehicle and a transponder which is introduced into the floor at a specific location and which is charged by a transmission field that is generated by the antenna during a transmission interval with a preset length, the system further comprising a computerized evaluator and wherein an evaluation interval with a preset length is subsequently started by the computerized evaluator in order to evaluate by the computerized evaluator a signal of the transponder that is transmitted as a response to the charging during the evaluation interval, wherein the evaluation interval is interrupted by the system before expiry of its preset length and a new transmission interval is started by the system if, during a detection interval with a preset length within the evaluation interval, no signal of the transponder is detected, and wherein the computerized evaluator transmits signals to the controller regarding detection of the transponder.

2. The system as claimed in claim 1, wherein the new transmission interval is started only after full expiry of the evaluation interval if a signal of the transponder is detected during the detection interval.

3. The system as claimed in claim 1, wherein the transmission interval lasts less than 10 ms, the detection interval lasts less than 5 ms, and the evaluation interval lasts less than 20 ms.

4. The system as claimed in claim 1, wherein the transmission field comprises an effective area that extends beyond antenna dimensions of the antenna.

5. The system of claim 4, wherein the transmission field extends beyond the antenna dimensions of the antenna in and opposite to a direction of travel of the transport vehicle.

6. A method for determining the position of a transport vehicle which can travel over a floor, said method comprising:
 charging a transponder during a transmission interval with a preset length by an antenna which is attached to a lower face of the transport vehicle, wherein the transponder is introduced into the floor for the transport vehicle at a specific location;
 evaluating via a computerized evaluator a signal of the transponder that is transmitted as a response to the charging during an evaluation interval with a preset length, wherein the evaluation interval is subsequently started and the signal of the transponder is transmitted as a response to the charging; and
 interrupting the evaluation interval before expiry of its preset length and starting a new transmission interval if, during a detection interval with a preset length within the evaluation interval, no signal of the transponder is detected.

7. The method as claimed in claim 6, wherein the new transmission interval is started only after full expiry of the evaluation interval if a signal of the transponder is detected during the detection interval.

8. The method as claimed in claim 6, wherein the transmission interval lasts less than 10 ms, the detection interval lasts less than 5 ms, and the evaluation interval lasts less than 20 ms.

9. The method as claimed in claim 6, further comprising a transmission field that comprises an effective area that extends beyond antenna dimensions of the antenna.

10. The method as claimed in claim 9, wherein the transmission field extends beyond the antenna dimensions of the antenna in and opposite to a direction of travel of the transport vehicle.

11. The method as claimed in claim 7, wherein the transmission interval lasts less than 10 ms, the detection interval lasts less than 5 ms, and the evaluation interval lasts less than 20 ms.

12. The method as claimed in claim 11, wherein the transmission interval lasts less than 8 ms, the detection interval lasts less than 2 ms, and the evaluation interval lasts less than 18 ms.

13. The method as claimed in claim 7, further comprising a transmission field that comprises an effective area that extends beyond antenna dimensions of the antenna.

14. The method as claimed in claim 13, wherein the transmission field extends beyond the antenna dimensions of the antenna in and opposite to a direction of travel of the transport vehicle.

15. A transport vehicle system, said transport vehicle system comprising:
- a transport vehicle having a lower face and a controller, wherein the transport vehicle can travel over a floor and an antenna is attached to the lower face;
- a transponder that is introduced into the floor at a specific location, wherein the transponder is charged by a transmission field that can be generated by the antenna during a transmission interval with a preset length that is started by the system, and wherein the transponder is configured to output a signal as a response to the charging;
- a computerized evaluator, said computerized evaluator configured to evaluate the signal of the transponder during an evaluation interval having a preset length that is started by the computerized evaluator; and
- wherein the evaluation interval is interrupted by the system before expiry of its preset length and a new transmission interval is started by the system if, during a detection interval with a preset length within the evaluation interval, no signal of the transponder is detected, and wherein the computerized evaluator transmits signals to the controller regarding detection of the transponder.

16. The transport vehicle system of claim 15, wherein the transport vehicle comprises a driverless heavy-load transport vehicle.

17. The transport vehicle system of claim 15, wherein the new transmission interval is started only after full expiry of the evaluation interval if a signal of the transponder is detected during the detection interval.

18. The transport vehicle system of claim 15, wherein the transmission interval lasts less than 10 ms, the detection interval lasts less than 5 ms, and the evaluation interval lasts less than 20 ms.

19. The transport vehicle system of claim 15, wherein the transmission field comprises an effective area that extends beyond antenna dimensions of the antenna.

20. The transport vehicle system of claim 15, wherein the transmission field extends beyond the antenna dimensions of the antenna in and opposite to a direction of travel of the transport vehicle.

* * * * *